C. E. SEARLES.
TOBACCO PIPE.
No. 67,356.
Patented July 30, 1867.
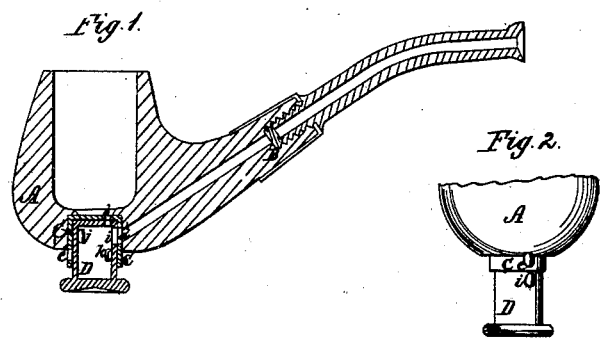
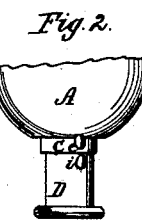
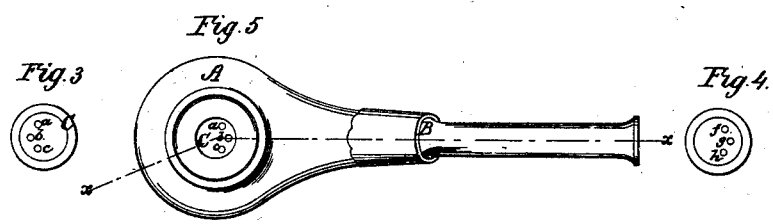
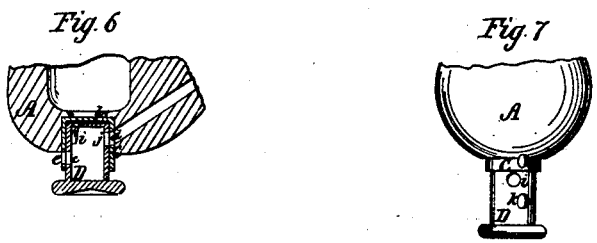
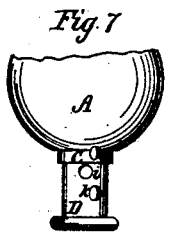
Witnesses:
Wm R Cooper
Thaddeus B. Beecher
Inventor:
Chas. E. Searles
by M. M. Livingston
Attorney

United States Patent Office.

CHARLES E. SEARLES, OF STAMFORD, CONNECTICUT, ASSIGNOR TO HIMSELF, EDWIN HOYT, AND LAFAYETTE FARRINGTON, OF THE SAME PLACE.

Letters Patent No. 67,856, dated July 30, 1867.

IMPROVEMENT IN TOBACCO-PIPES.

*The Schedule referred to in these Letters Patent and making part of the same.*

TO ALL WHOM IT MAY CONCERN:

Be it known that I, CHARLES E. SEARLES, of Stamford, in the county of Fairfield, and State of Connecticut, have invented a new and useful Improvement in Tobacco-Pipes; and I do hereby declare that the following is a full, clear, and exact description of the same, reference being had to the accompanying drawing, which forms part of this specification.

My invention consists in the combination with the bowl and stem of a tobacco-pipe of a socket, having a top perforated or open on one of its sides, and an aperture in one side letting into the bore of the stem, and an aperture on the opposite side opening outside the pipe, the socket being set into the base of the bowl of the pipe; also, in combination therewith of a cup having closed ends, one of which is perforated or open on one side to correspond with a similar opening in the socket, and provided with three apertures or holes, one of which opens into the bore of the stem when the pipe is to be used for smoking; and when it is desired to clean out the stem or cup by blowing water through the stem, one of the other holes corresponds with the bore of the stem and the other with that hole in the socket which opens outside the pipe; all of the parts being combined together and operating in the manner hereinafter described. In the accompanying drawing, which illustrates my invention—

Figure 1 is a central section of the pipe and stem taken on the line $x\ x$, fig. 5, showing my improvement arranged in proper position for using the pipe for smoking.

Figure 2 is a view of my improvement just as the cup is being shoved into the socket to assume the position shown in fig. 1.

Figure 3 is a top view of the top of the socket, and

Figure 4 a top view of the top of the cup.

Figure 5 is a plan or top view of the pipe.

Figure 6 is a central section, showing my improvement in position for blowing water or other fluid through the stem to clean out the same, as well as the cup.

Figure 7 is a view of the cup just as it is being shoved into the socket to assume the position shown in fig. 6.

A designates the bowl and B the stem of a tobacco-pipe. C is a socket made of metal, and screwed into a recess made in the base of the bowl of the pipe, so that its upper end will form a portion of the bottom of the tobacco-receiving cavity in the bowl. The top of this socket is provided on one of its sides with apertures $a\ b\ c$, (refer to figs. 1, 5, 6,) or in lieu thereof a slot may be cut, which would answer the same purpose. This cup is also provided with an aperture or hole, $d$, opening into the bore of the stem; it is also provided with another aperture, $e$, which opens outside the bowl of the pipe. D is a cup, which is made of metal, and fitted to slide tightly in the socket C. This cup has both its ends closed, the bottom wall extending sufficiently beyond the sides to form a good hold for the fingers to grasp it for pushing it into and drawing it out of the socket, as well as for turning it round. The top wall is perforated on one side, as shown at $f\ g\ h$, (figs. 4 and 6,) to correspond with the apertures $a\ b\ c$ in the socket C; or in lieu thereof a slot may be made, if desired, or a portion of the wall on one side cut away, but the apertures in both the socket and cup should be made so as to correspond with each other when the socket and cup are in the position shown in fig. 1, to allow the smoke to be drawn through them and into the cup. The cup is provided with an aperture or hole, $i$, on one side, which, when the cup is in the position shown in fig. 1, corresponds with the hole or aperture $d$ in the socket. It is also provided with two other apertures, $j\ k$, the one, $j$, to correspond with the hole $d$ in the socket, and the other with the hole $e$ in the socket, (see fig. 6,) when it is desired to blow water or other fluid through the stem and cup for cleaning out the stem and cup.

Fig. 1 shows the pipe in position for smoking. Here it will be observed that the smoke is drawn through the apertures $a\ b\ c$ and $f\ g\ h$ into the cup, where the nicotine and other poisonous matter are deposited from the smoke; thence it passes through the holes $i\ d$, and up through the stem; thus a perfect draught is insured, all the other apertures being closed whilst the cup is in this position.

Fig. 6 shows the pipe in position for cleaning out the stem and cup. Water, alcohol, or other fluid may be taken into the mouth and blown down the stem, when it will pass through the hole $d$ and the hole $j$ into the cup, and then out through the holes $e\ k$.

By this arrangement I produce a pipe which possesses all the qualities of other pipes for extracting from the smoke the nicotine and other poisonous matter which it usually contains, and, in addition, I provide a means for cleaning out the cup and stem in a very simple way. The parts C D can be cheaply made, and applied to any ordinary pipe.

What I claim as my invention, and desire to secure by Letters Patent, is—

The combination with the bowl and stem of a tobacco-pipe of the socket C and cup D, both provided with an aperture or apertures in the top, and the former with the holes or apertures $d\ e$ on opposite sides, and the latter with the holes $i\ j\ k$ on opposite sides, all arranged and operating substantially as herein specified.

CHARLES E. SEARLES.

Witnesses:
M. M. LIVINGSTON,
T. B. BEECHER.